United States Patent [19]
Higuchi

[11] 4,155,791
[45] May 22, 1979

[54] METHOD FOR MANUFACTURING UNIDIRECTIONALLY FIBER REINFORCED RESIN PRODUCTS

[76] Inventor: Kenichi Higuchi, No. 2-17, 7-chome, Shinimazato, Ikuno-ku, Osaka-shi, Osaka-fu, Japan

[21] Appl. No.: 842,890

[22] Filed: Oct. 17, 1977

[51] Int. Cl.² .............................................. B29D 23/00
[52] U.S. Cl. ................................... 156/161; 156/165; 156/189; 156/194; 156/494; 254/67; 264/229
[58] Field of Search ............... 156/161, 165, 184, 494, 156/162, 189, 194; 264/290 R, 292, 229; 269/48.1, 47, 50; 279/2 R; 254/67; 81/3 J

[56] References Cited

U.S. PATENT DOCUMENTS

| | | | |
|---|---|---|---|
| 1,276,702 | 8/1918 | Anderson | 254/67 |
| 1,709,019 | 4/1929 | Hull | 254/67 |
| 2,768,921 | 10/1956 | Rigg | 156/194 |
| 2,784,457 | 3/1957 | Dunmire | 264/290 |
| 3,231,442 | 1/1966 | Michael | 156/165 |
| 3,313,671 | 4/1967 | Ritchie | 156/189 |
| 3,433,696 | 3/1969 | Michael | 156/162 |
| 3,442,738 | 5/1969 | Scott et al. | 156/161 |
| 3,888,714 | 6/1975 | Fiser et al. | 156/165 |
| 3,974,012 | 8/1976 | Hogarth | 156/161 |

*Primary Examiner*—Jerome W. Massie
*Attorney, Agent, or Firm*—Cantor and Singer

[57] ABSTRACT

A method for manufacturing unidirectionally fiber reinforced resin products characterized by application of a given initial tension to the fibers at curing of the resinous material and an apparatus for manufacturing the same which essentially comprises means keeping the fibers under a given tension at curing of the resinous material. With the application of initial tension to the fibers, an initial distortion of the fibers is much reduced and a product of uniform quality and great strength is provided.

2 Claims, 12 Drawing Figures

METHOD FOR MANUFACTURING UNIDIRECTIONALLY FIBER REINFORCED RESIN PRODUCTS

This invention relates to a method for manufacturing fiber reinforced synthetic resin products, more particularly unidirectionally orientated fiber reinforced synthetic resin products and an apparatus for manufacturing the same.

It is already known to manufacture unidirectionally fiber reinforced synthetic resin products by employing fibers of high tensile resistance, e.g., carbon filaments, metal fibers, chemical fibers, etc. as reinforcing fibers and coating or impregnating these fibers with a thermosetting resin such as phenolic resin or a cold-setting resin such as an epoxy resin. This conventional method, however, has a serious drawback in that the fibers are forcibly retracted to be slackened and partially subjected to compression in the longitudinal direction thereof by the surrounding resinous material due to its shrinkage at curing and heat shrinkage after heat curing, and accordingly the fibers are molded in the state that the fibers are partially bent or relaxed in case the linear expansion coefficient of the fibers employed is smaller than that of the resinous material employed. Since the fibers cannot bear the compression when they are compressed in the longitudinal direction thereof, the fibers, after the resinous material is cured and shrunk, are rendered nonlinear, wavy or irregularly curved and are fixed in the resinous material in the relaxed state. Accordingly, though the fibers appear to be oriented in the longitudinal direction of the molded product, the fibers are in fact set in the relaxed state and are not disposed properly in a linear parallel relation. Therefore, the products thus obtained are not uniform in strength and accordingly cannot be homogeneous and cannot have the desired strength. Thus, it can be said that an effect of the real unidirectional fiber reinforced resin product cannot be attained with the conventional method.

The inventor of the present invention has found that an initial deflection of the fibers is minimized by applying initial tension to the fibers disposed in the resinous material at molding of the unidirectionally fiber reinforced resin and the molded products thus obtained are uniform in strength and quality and have sufficiently high strength.

It is therefore an object of the present invention to provide a novel method and apparatus for manufacturing unidirectionally orientated fiber reinforced resin products which are homogeneous, uniform in strength and of high strength.

According to the present invention, there is provided a method for manufacturing a unidirectionally fiber reinforced synthetic resin product, characterized by arranging fibers in one direction, and curing the resinous material while applying a given tension to the fibers.

The invention will be better understood from the following description taken in connection with the accompanying drawings in which.

Figure 1:
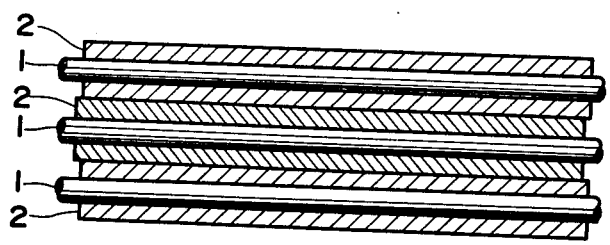
FIG. 1 is an enlarged fragmentary longitudinal sectional view of a pipe wall of a tubular product.

Referring now to the drawings, there is illustrated a preferred embodiment of the present invention.

Figure 2:
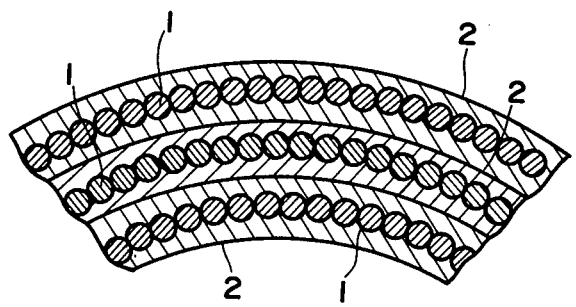
FIG. 2 is an enlarged fragmentary cross sectional view of the pipe wall of FIG. 1.

FIGS. 1 and 2 show one form of a general tubular product in longitudinal section and cross section, respectively. Numeral 1 designates fibers and numeral 2 a resinous material. Though a laminate structure formed of three layers is shown in FIGS. 1 and 2, the number of laminations may be suitably selected according to necessity.

Figure 4:
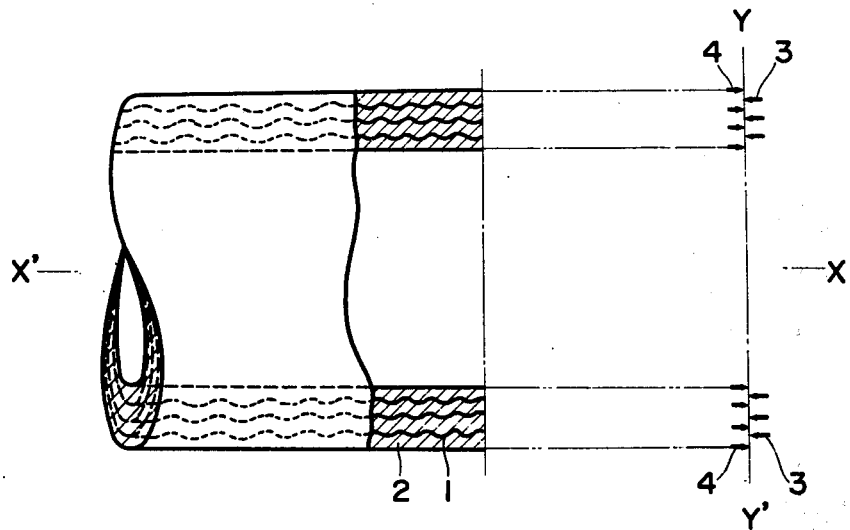
FIGS. 4 and 5 are enlarged fragmentary views partly in longitudinal section of a tubular product in accordance with a conventional method.

In this connection it is to be noted that when the layers comprising fibers and a resinous material are laminated around a mandrel having a profile corresponding to the inner surface of a tubular product to be obtained and the laminate is subjected to curing to set the resinous material according to the conventional method to obtain a molded article having the structure as shown in FIGS. 1 and 2, the resinous material shrinks and the fibers 1 are inevitably slackened or relaxed as shown in FIG. 4 for the reason as mentioned above. Stresses acting on the resinous material 2 and the fibers 1 are indicated by arrows 3 and 4. Stated illustratively, a compression stress 3 acts on the fibers 1 and a tensile stress 4 acts on the resinous material 2. As mentioned above, the compression stress of the fibers 1 is limited and cannot be so large.

When a bending moment M acts on the tubular product due to its own weight or external force applied thereto, the fibers 1 located on the tight side are stretched and the fibers 1' located on the slack side or compressed side are retracted. Since the degree of deformation is relatively small, only the relaxation rate of the fibers 1 is decreased and no tensile stress due to the tension of the fibers 1 themselves is exerted. Accordingly, the tubular product resists the bending by the actions of the tensile stress 4 and the compression stress 4' of the resinous material 2. However, the modulus of the resinous material, for example with respect to KEVLAR-49 (trade name of aromatic polyamide type fibers manufactured and sold by Du Pont Co., U.S.A.), is $1.3 \times 10^6$ kg/cm$^2$. Accordingly, the tubular product is liable to be distorted or deflected as far as the tension is not exerted on the fibers.

Figure 5:
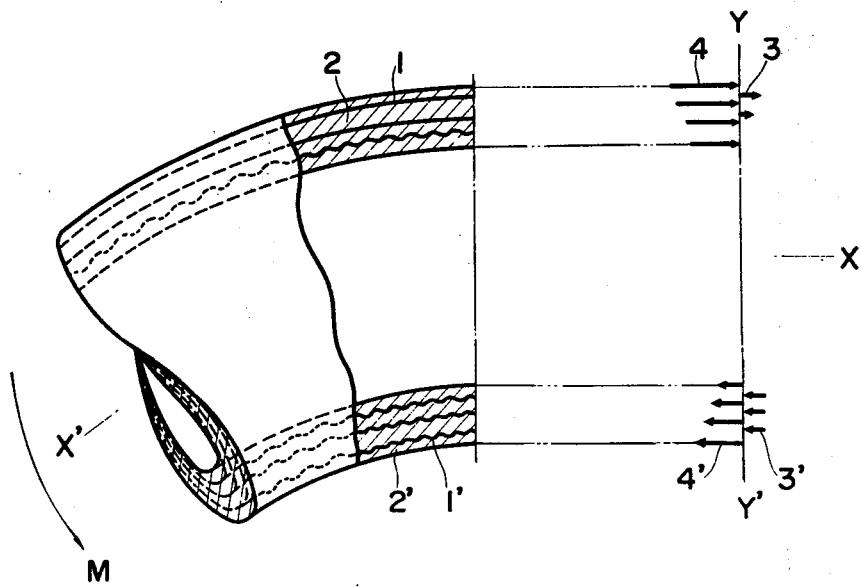

As the bending moment M gets larger and a tension is set up on the fibers 1 on the tight side in FIG. 5, the fiber stress 3 is changed to a tensile stress and first effectively imparts a reinforcing function to the fibers.

Figure 8:
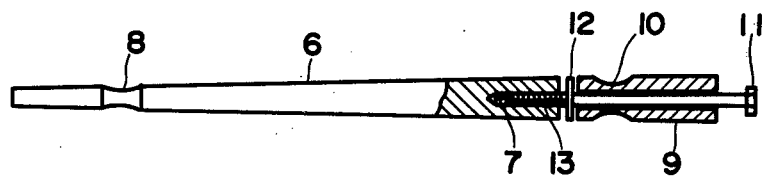
FIG. 8 is a side view partly in section of a mandrel in accordance with the present invention.
Figure 9:
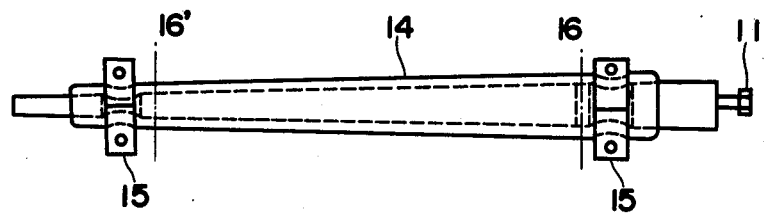
FIG. 9 is a side view of the mandrel with resin impregnated cloth wound therearound.
Figure 10:
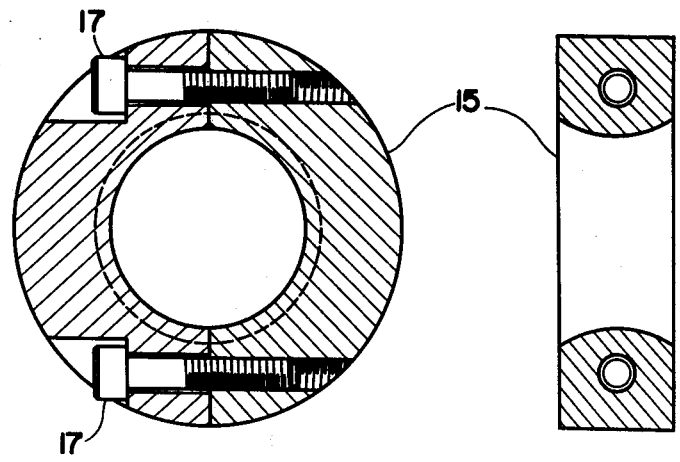
FIG. 10 is cross and longitudinal sectional views of a clamp employable for the mandrel of FIGS. 8 and 9.

In FIGS. 8 to 10, one preferred mode of method and apparatus for manufacturing a tubular product according to the present invention is shown. FIG. 8 shows one example of a mandrel formed in a tapered shape varying its diameter along its length. Of course a mandrel of uniform diameter from end to end may be employed in the present invention according to necessity. Numeral 6 designates a main member of the mandrel which has an internal screw thread 7 at its one end portion and a groove 8 at its other end portion on the periphery thereof. Numeral 9 designates an auxiliary mandrel member. A shaft 11 with a head is inserted through a central hole of the auxiliary mandrel member 9 and has a screw 13 at its one end through a flange 12 formed integrally with the auxiliary mandrel member 9. The screw 13 is screwed into the thread 7 until the flange 12 abuts against the main mandrel member 6 and the auxiliary mandrel member 9 is slided to a position where it contacts the flange 12. The auxiliary mandrel member 9 also has a groove 10 on the periphery thereof. A prepreg sheet 14 formed of fibers orientated in one direction and impregnated with resinous material is wound around the mandrel so as to dispose the fibers in parallel with the axial direction of the mandrel.

In FIG. 9, the prepreg sheet 14 wound around the mandrel is fixed at its end portions by clamps 15,15, which are dividable into complementary members as shown in FIG. 10, through a screw 17. The clamping positions correspond to the grooves 8 and 10. As the head of the shaft 11 is rotated in the direction to disengage the screw 13 from the thread 7, the auxiliary mandrel member 9 is spaced away from the main mandrel member 6 and tension is imposed to the fibers of the prepreg sheet 14. In order to easily obtain a suitable tension, the number of rotations of the screw 13 is advantageously determined preliminarily with reference to the length of the mandrel.

Figure 6:
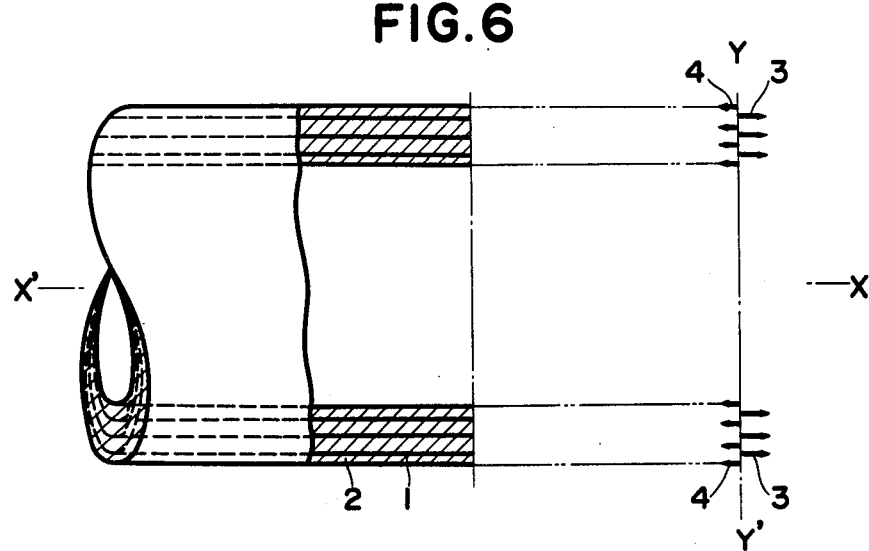
FIGS. 6 and 7 are similar enlarged fragmentary views partly in longitudinal section of a tubular product in accordance with the present invention.

The prepreg sheet 14 is then subjected to curing by heating or at normal temperature while keeping the fibers under tension, subsequently cooled, and cut where indicated by 16, 16' in FIG. 9. The clamps 15,15 are then opened and scraps of the tubular product are removed to take off the central tubular product. The inner structure of the thus obtained tubular product is shown in enlarged sectional views of FIGS. 6 and 7. The fibers 1 are disposed and fixed linearly and are not slackened or relaxed. Numeral 3 shows a tensile stress of the fibers 1 and numeral 4 a compression stress of the resinous material 2. As compared with the conventional one, it can be seen that the directions of the stresses are reversed.

Figure 7:
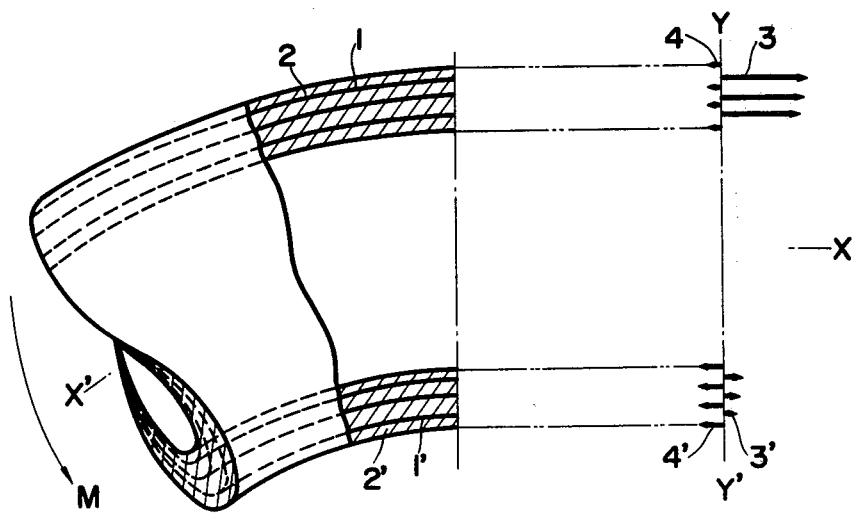

FIG. 7 shows the same tubular product subjected to a bending moment M. Even when the load is relatively small, the tensile stress 3 is exerted on the fibers 1 of the tight side and the tensile stress 3' is left though reduced. Accordingly, the fiber stress always acts on the tubular products correspondingly to the external forces applied. Thus, the distortion degree of the tubular product due to a tension or a bending depends mainly upon the modulus of the fibers and the initial distortion can be much reduced.

Figure 3:
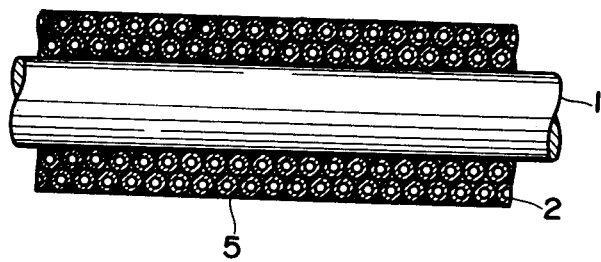
FIG. 3 is an enlarged fragmentary longitudinal sectional view of a prepreg sheet with fillers incorporated therein.

FIG. 3 shows one form of prepreg sheet with fillers 5 incorporated in a resinous material 2 which is employed where the resinous material is possibly subjected to plastic deformation in a long time due to the compression stress exerted on the resinous material 2. In FIG. 3, numeral 1 also designates fibers. As the fillers 5, there are advantageously employed fine particles having a high modulus, for example, hollow molten particles or solid particles of alumina. These particles are incorporated in the resinous material so as to be adjacent each other and not only impart to the resinous mateial 2 a high compression strength and a high modulus but also prevent creep which is possibly caused when the resinous material is continually subjected to a stress.

Figure 11:
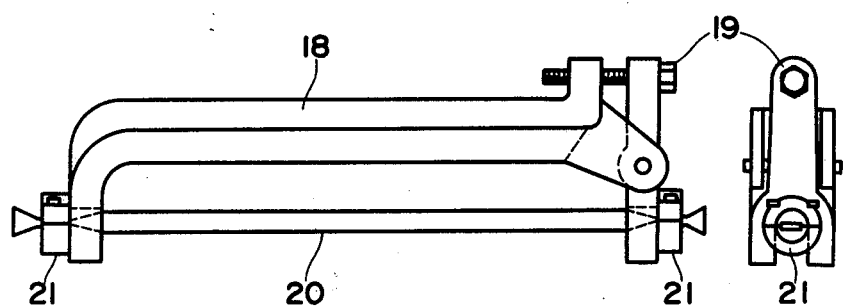
FIG. 11 is a side view of a setting jig employable for manufacturing a solid product in accordance with the present invention.
Figure 12:
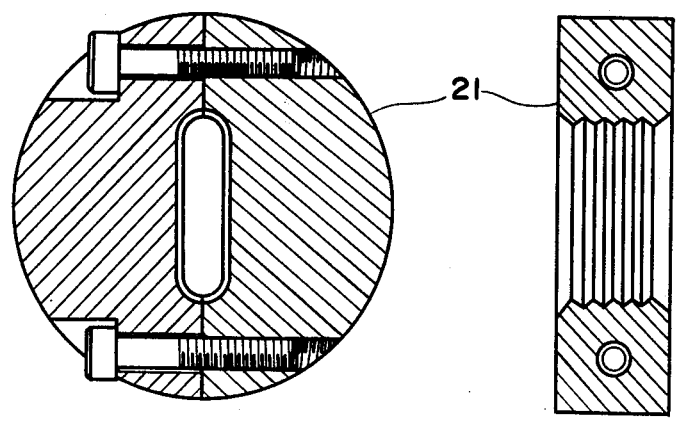
FIG. 12 is cross and longitudinal sectional views of a clamp employable for the setting jig of FIG. 11.

Though the foregoing descriptions are given referring to a method for an annular hollow product such as an annular pipe or tube, products of various sections, hollow or solid, may also be obtained according to the present invention. In order to obtain a solid product, a setting jig 13 as shown in FIG. 11 and a clamp 21 as shown in FIG. 12 may be advantageously employed. A solid product 20 is stretched by means of a screw 19. Thus, the clamp 21 can set the material under a given tension without sliding the material.

The products thus obtained according to the present invention have excellent unidirectionally fiber reinforced characteristics and excellent performances and are advantageously utilized as fishing rods or pipes for chemical industries.

What is claimed is:

1. A method for manufacturing a unidirectionally fiber reinforced synthetic resin product comprising providing a mandrel having two members which are adjustably separatable by means of a shaft member threadedly engaged with one end portion of one of said members and having a flange abutting against said one end portion of one of said members and against one end portion of the other of said members; winding a prepreg sheet comprising fibers impregnated with a resinous material around said mandrel, said fibers being oriented longitudinally with respect to said mandrel; securing one end of said wound sheet to said first member; securing the other end of said wound sheet to said second member; longitudinally separating said two mandrel members using said adjusting means in an amount sufficient to supply a predetermined amount of tension to said fibers; and curing said resin.

2. A method for manufacturing a unidirectionally fiber reinforced synthetic resin product according to claim 1, which further comprises removing the cured prepreg sheet from the mandrel.

* * * * *